Dec. 4, 1934.　　　　R. L. STITH　　　　1,983,199

CIRCULATING WATER HEATER

Original Filed May 5, 1932

Inventor
Roy Stith

By

Attorney

Patented Dec. 4, 1934

1,983,199

UNITED STATES PATENT OFFICE 1,983,199

CIRCULATING WATER HEATER

Roy Lee Stith, Locust Grove, Okla.

Application May 5, 1932, Serial No. 609,451
Renewed April 26, 1934

6 Claims. (Cl. 237—19)

This invention is a novel and efficient combined hot water heating system and service system particularly adapted for use in heating rooms, or floors of a building, or like spaces of relatively low height, whereby hot water may be withdrawn from points in the piping system as desired while automatically maintaining a constant water level therein, said system including a hot water storage tank from which the water is withdrawn through a valved outlet in its lower end, and passes through fire coils or the like heated by a burner or the like in substantial proximity to the lower end of the tank, the water passing upwardly through circulating coils in the room or the like, which coils are disposed below the water level in the tank, the circulating coils, if desired, being provided with suitable extension circulating coils also disposed below the water level in the tank and provided with branches leading to various hot water taps disposed below the water level of the tank, the upper end of the circulating coils discharging through a pipe into the upper end of the tank, whereby the heat applied to the fire coils will cause the water in the pipes to rise and circulate around through the circulating piping and back into the tank, means being provided for maintaining the water in the tank and system at a constant level, and the tank having suitable pressure relief valves.

Other minor objects of the invention will be hereinafter set forth.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

Figures 1, 2, 3:
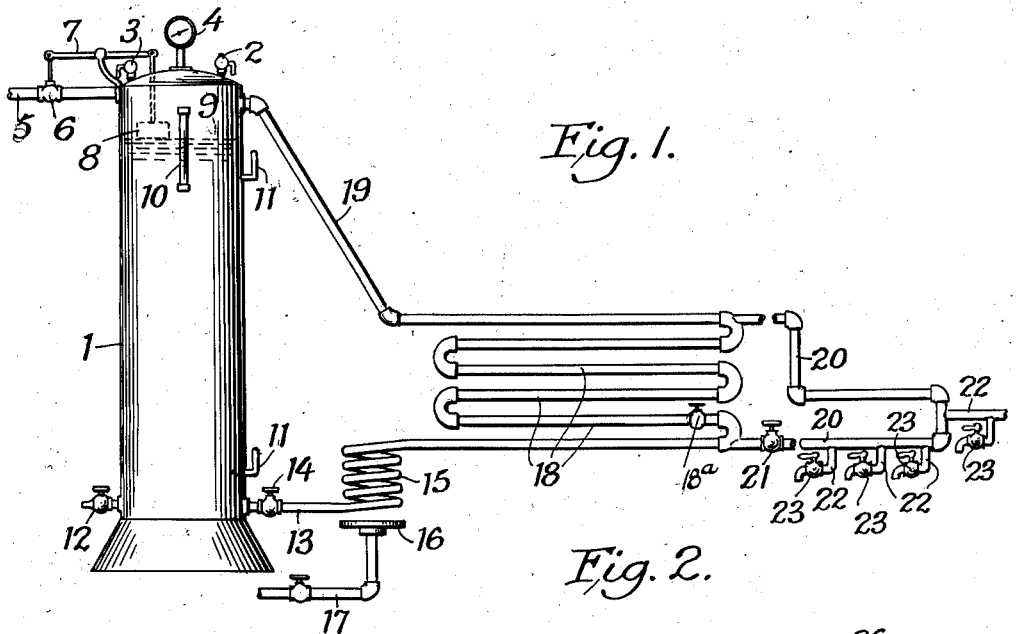
Fig. 1 is an elevation showing one arrangement of my novel system.
Fig. 2 is an enlarged vertical section through a modified form of heater, detached.
Fig. 3 is a view similar to Fig. 1 showing a modified arrangement of my system.

As shown in Fig. 1, my system preferably includes a tank 1 adapted for the storage of hot water which is to be circulated through the combined heating and hot water service piping of the room, the tank being closed at its upper end and provided with a vacuum valve 2, pressure release valve 3, pressure gauge 4, and with a water inlet pipe 5 having a valve 6 therein operated by a pivoted lever 7 controlled by the rise and fall of a float 8 disposed within the tank to maintain the water in the tank at the constant level denoted by the line 9. A water level gauge glass 10 may also be provided, and thermometers 11 may be applied to the tank adjacent the upper and lower ends of the water column. At the bottom of the tank is a drainage valve 12.

A water outlet pipe 13 extends from the lower end of the tank, said pipe having a valve 14 therein controlling the flow of water to the fire coil 15, which coil is disposed substantially opposite the lower end of the water column in tank 1, and coil 15 is heated by a heater 16, which may be a liquid or gaseous fuel burner or may comprise any other form of heater or burner, the fuel being supplied through a pipe 17. The particular form of burner forms no part of my invention.

Pipe 13 is connected to the lower end of the fire coil 15, the upper end of the coil being connected with the lower end of the circulating heating coil 18 which is disposed above the coil 15 and below the water level 9 in tank 1. The coil 18 may be arranged in any desired manner provided that the water enters the coils at the lower end, and leaves the coils at the upper end. From the upper end of coil 18 extends a pipe 19 which discharges into the upper end of tank 1.

A suitable extension circulating heating coil 20 may be arranged in parallel relation with respect to coil 18, the coil 20 being controlled by a valve 21, and may be provided with branch pipes 22 provided with faucets 23 or other hot water service valves.

By the above construction the hot water from the fire coil 15 circulates upwardly through the coil 18 and the extension circulating coil 20, into the upper end of the tank 1, and from thence downwardly through tank 1 through the outlet 13 at the bottom of the tank and back into the fire coil 15. In event any water is withdrawn from the system through the valves or faucets 23 or the like, the water level in the tank 1 will drop, and the float 8 will drop thereby opening the water supply valve 5 to admit sufficient water to the tank to make up for that withdrawn. If the pressure in the tank should reach a dangerous point the pressure release valve 3 will automatically open and prevent damage to the system. The fire coil 15 (or heater 24) may be disposed at any distance from, or in proximity to, the tank 1. In each coil 18 is a valve 18a which may be disposed as shown in Figs. 1 and 3 to cut off the coils 18 from the extension coils 20 when only light heating or light water service is desired.

In Fig. 2 a modified form of heater is shown, utilizing the same fuel burner 16 shown in Fig. 1. However, the heater itself comprises a casing 24 having a water inlet 25 at its lower end, and a water outlet 26 at its upper end which is connected to the circulating coil 18 (Fig. 3) in a manner similar to the coil 15 in Fig. 1, the heater 24 being usable in place of the coil heater shown in Fig. 1 and having the same function. The vertical flues 27 in the casing 24 permit the fumes from the burner to pass upwardly through the casing and assist in heating the water in the casing.

In Fig. 3 the system is substantially identical with that shown in Fig. 1 with the exception that the heater 24 is arranged in the circuit instead of coil 15.

I claim:—

1. In a combined hot water heating system, a water storage tank; an outlet at the bottom of the tank; a heating coil connected to the outlet, circulating heating coils rising progressively from the upper end of the heating coil and returning to the upper portion of the tank; and means for heating the heating coils.

2. In a system as set forth in claim 1, means for withdrawing water from points in said circulating heating coils.

3. In a combined hot water heating and service system, a water storage tank; means for maintaining a constant water level in the tank; an outlet at the bottom of the tank; circulating heating coils disposed within the limits of the water column in the tank and extending from the outlet and rising progressively and returning to the upper portion of the tank; means for withdrawing water from points in the circulating coils; a water heater disposed between the outlet and the lowest coil, and means for heating the heater.

4. In a system as set forth in claim 3, said water withdrawing means comprising extension circulating coils including taps arranged in parallel relation with the main coils, and valves for controlling the entry of water into the extension coils.

5. In a combined hot water heating and service system, a water storage tank; an inlet for said tank; valve means in said inlet controlled by the rise and fall of the water in said tank for maintaining a constant water level; an outlet at the bottom of the tank; circulating heating coils disposed within the limits of the water column in the tank and extending from the tank outlet and rising progressively and returning to the upper end of the tank; means for withdrawing water from the circulating coils; a heater in the circulating heating coils disposed at substantially the lowest level of the coils, and a burner for said heater.

6. In a system as set forth in claim 5, said water withdrawing means comprising extension circulating coils including taps arranged in parallel relation with the main coils, and valves for controlling the entry of water into the extension coils.

ROY LEE STITH.